June 22, 1954  V. R. GIBSON, JR  2,682,002
TRANSFORMERLESS VOLTAGE MULTIPLIER CIRCUITS
Filed July 25, 1952

Inventor:
Van R. Gibson, Jr,
by Merton D Moore
His Attorney.

Patented June 22, 1954

2,682,002

UNITED STATES PATENT OFFICE 2,682,002

TRANSFORMERLESS VOLTAGE MULTIPLIER CIRCUITS

Van R. Gibson, Jr., North Syracuse, N. Y., assignor to General Electric Company, a corporation of New York Application July 25, 1952, Serial No. 300,885

8 Claims. (Cl. 307—110)

The present invention relates to transformerless voltage multipliers and more particularly, to circuits for rectifying and multiplying an alternating voltage to produce a plurality of direct voltages. The invention has particular utility in the power supply systems of radio and television receivers and the like.

Radio and television receivers frequently require direct voltages of values in excess of that of the alternating supply voltage. In order to provide voltages higher than the source voltage, means for multiplying the source voltage are usually employed. One conventional method of voltage multiplication of the output of an alternating current source is to use a step-up transformer. By the provision of various secondary windings or taps, transformers offer the advantage of a wide variety of voltages simultaneously available with respect to a given reference point of potential. However, they are relatively bulky and heavy devices that are comparatively expensive to manufacture. When transformers are employed, it is necessary to provide separate means for rectifying the alternating current of the supply to produce the desired direct current.

Less bulky and lighter voltage multipliers that are generally less expensive to manufacture have been devised that utilize unidirectional conducting devices, in cascade circuit with other elements, to multiply and rectify the output of an alternating current source. One disadvantage of such multipliers currently available is that the various direct multiples of the fundamental voltage, simultaneously available with respect to the same reference point, are limited in number for a given multiplier. In the case of the conventional voltage doubler of this type, for example, the fundamental direct voltage with respect to a common reference point is not normally available simultaneously with the doubled direct voltage.

It is a primary object of the present invention to provide an improved voltage multiplier that can be constructed to provide simultaneously a rectified component of an alternating voltage of any desired integral multiple, including the fundamental voltage, with respect to a common reference point.

It is another object of the present invention to provide an improved power supply circuit for radio and television receivers and the like.

It is a further object of the present invention to provide a voltage multiplier of the type described that employs conventional circuit components in its construction and that is simple to construct.

In accordance with the present invention there is provided a plurality of unidirectional conducting devices in series circuit relation with one another and a plurality of charging capacitors connected to said devices to form a cascade voltage multiplier circuit for rectifying and multiplying an alternating voltage. Means are provided for deriving from the multiplier circuit a voltage with respect to a reference point of potential common to the normal multiplier output. This derived voltage includes a component of direct potential and a component of alternating potential varying in proportion to the alternating source voltage. An inductance input type filter is provided for filtering the alternating component out of the derived voltage, thereby to provide with respect to said common reference point of potential a rectified integral voltage multiple of the fundamental voltage of the multiplier not normally available from the multiplier without the filtering circuit.

For additional objects and advantages, and for a better understanding of the invention, attention is now directed to the following description and accompanying drawing. The features of the invention which are believed to be novel are particularly pointed out in the appended claims.

Figure 1:
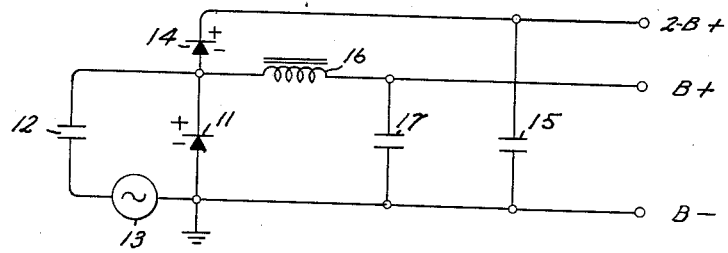
Fig. 1 is a schematic circuit diagram of a voltage doubler embodying my invention.

Referring now to Fig. 1, there is shown a first unidirectional conducting device 11, represented as a diode rectifier, in series circuit relation with a first charging capacitor 12 and an alternating current source 13. A second rectifier 14, having its negative terminal connected to the positive terminal of rectifier 11, is connected to one electrode of a doubler charging capacitor 15 which has its other electrode connected to the negative terminal of rectifier 11. A choke coil 16 is connected in series with a filter capacitor 17 across rectifier 11. The negative terminal of rectifier 11 is connected to the B— output terminal which is grounded. The B+ output terminal is connected to a point between coil 16 and capacitor 17 and the doubler output terminal 2B+ is connected to a point between rectifier 14 and capacitor 15. Any suitable load circuits (not shown) may be connected between the B— terminal and selected B+ terminals in well-known manner.

During one half-cycle of applied alternating voltage from source 13, rectifier 11 conducts to charge capacitor 12 while rectifier 14 acts as an open circuit element. During the other half-cycle of voltage from source 13, rectifier 11 acts as an open circuit element while diode 14 conducts to charge capacitor 15. Since the charge on capacitor 12 is added to the voltage of the source, capacitor 15 is charged to approximately twice the source voltage, thus providing a doubled rectified voltage 2B+ with respect to common ground in a conventional manner.

The voltage appearing across rectifier 11 comprises a direct, or rectified, component during its conductive half-cycle and an alternating component, or inverse voltage, during the other half-cycle during which it does not conduct. Choke coil 16 provides a high impedance path for the alternating current from source 13 in order to shunt substantially all of its current flow through rectifiers 11 and 14. The direct voltage component appearing across rectifier 11, however, is readily conducted by coil 16 to charge capacitor 17 to the fundamental B+ voltage with respect to ground. Thus, in cooperation with capacitor 17, coil 16 provides an inductive input filter section in order to provide a substantially alternating-current-free, fundamental B+ component with respect to common ground by utilizing the direct current component appearing across rectifier 11.

Figure 2:
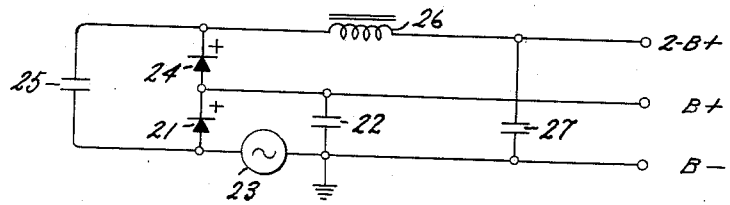
Fig. 2 is a schematic circuit diagram of a modified form of the circuit shown in Fig. 1.

Referring now to Fig. 2, there is shown a modified form of the circuit shown in Fig. 1. A first rectifier 21 is connected in series circuit relation with a first charging capacitor 22 and an alternating current source 23. A second rectifier 24 has its negative terminal connected to the positive terminal of rectifier 21. A doubler charging capacitor 25 is connected in series circuit relation with the two rectifiers 21 and 24. A choke coil 26 is connected to the positive terminal of rectifier 24 in series circuit relation with a filter capacitor 27 which is connected to the grounded side of source 23 remote from the negative terminal of rectifier 21. The fundamental B+ voltage output is derived across capacitor 22 while the doubler output 2B+ is derived across capacitor 25 and the source 23 in series therewith.

Charging capacitor 22 is charged during the half-cycle that source 23 provides current in the proper direction to cause rectifier 21 to conduct. During the other half-cycle of source 23, capacitor 25 is similarly charged through the closed conduction path including source 23, capacitor 22, rectifier 24, and capacitor 25. Since the charge on capacitor 22 due to the previous half-cycle is added to the charge on capacitor 25, it is clear that twice the fundamental voltage or 2B+ will appear across capacitor 25. An alternating component from source 23 is also present in series with capacitor 25 to ground, but choke 26 provides a high impedance path to alternating current from supply 23 and cooperates with capacitor 27 to reduce ripple in the doubler output 2B+ appearing between the 2B+ terminal and ground. The fundamental rectified voltage B+ appears across capacitor 22 to ground.

Thus, it is apparent that this circuit operates in a manner similar to the circuit shown in Fig. 1, but the position of the choke coil in the doubler 2B+ output circuit will provide a smoother doubler output than the circuit of Fig. 1.

Although filter capacitor 27 is preferably connected from the side of coil 26 remote from the negative terminal of diode 24 to ground, as shown in Fig. 2, capacitor 27 may in some cases be connected from said side of coil 26 to the electrode of capacitor 22 connected to the positive side of rectifier 21. This latter connection has the advantage of permitting the use of a capacitor 27 having a lower voltage rating than the former connection allows. However, it has the disadvantage of including any ripple present across capacitor 22 in the doubler output 2B+ and is therefore not normally recommended.

Whether the embodiment of Fig. 1 or that shown in Fig. 2 is to be employed depends upon the circuit requirements in a particular case. Since the choke coil should be placed in the low current path, the embodiment shown in Fig. 1 is preferable where the doubler voltage 2B+ output is to carry higher current than the fundamental voltage B+ output. Similarly, the circuit of Fig. 2 is preferable where the current drain is to be higher in the circuit supplied by the fundamental output voltage B+ leg or tap.

Figure 3:
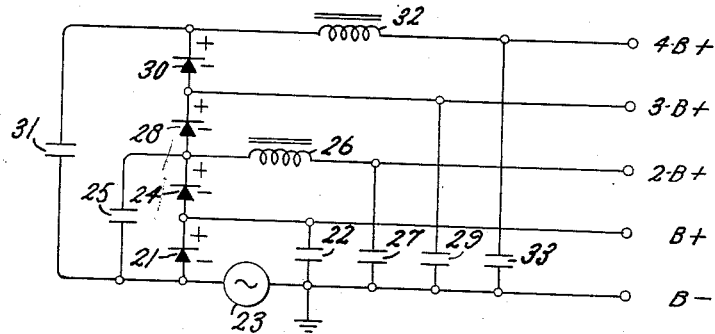
Fig. 3 is a schematic circuit diagram of a voltage quadrupler embodying my invention.

Referring now to Fig. 3, the elements bearing the numerals 21 to 27, inclusive, are similar to and are arranged in the same relation to one another as the elements of Fig. 2 bearing the same numerals. Furthermore, these elements perform the same functions as those of Fig. 2 bearing the same numerals, namely, that of a voltage doubler circuit.

The circuit of Fig. 3 additionally comprises a third rectifier 28 having its negative terminal connected to the positive terminal of rectifier 24 and its positive terminal connected to one electrode of a tripler charging capacitor 29. The other electrode of capacitor 29 is connected to the grounded side of source 23. A voltage tripler output tap 3B+ is provided on the electrode of capacitor 29 remote from ground. The circuit also includes a fourth rectifier 30 having its negative terminal connected to the positive terminal of rectifier 28 and its positive terminal connected to one electrode of a quadrupler charging capacitor 31. Capacitor 31 has its other electrode connected to the side of source 23 remote from ground. A choke coil 32 is provided having one terminal connected to the positive terminal of diode 30 and the other terminal connected to one electrode of a filter capacitor 33. The opposite electrode of capacitor 33 is also connected to the grounded side of source 23. A voltage quadrupler tap 4B+ is connected to the electrode of capacitor 33 remote from ground. All outputs appear with respect to the grounded, or B—, side of source 23.

The operation of the circuit shown in Fig. 3 is similar to the operation of the doubler circuit described above in connection with Fig. 2. On one half-cycle of voltage from the source 23, capacitor 22 is charged to the fundamental voltage B+. On the next half-cycle capacitor 25 is charged to twice the fundamental voltage 2B+. On the following half-cycle, of the same polarity as the first-mentioned half-cycle, choke coil 26 offers a high impedance to alternating current from source 23 and rectifier 28 conducts to charge capacitor 29 to the fundamental B+ voltage in addition to the doubled voltage 2B+ on capacitor 25, thus producing the tripled voltage 3B+. On the next half-cycle rectifier 30 conducts and capacitor 31 is charged to the quadrupled voltage 4B+ in a similar manner. Choke coil 32 offers high impedance to alternating current from source 23 at the quadrupler output terminal 4B+ and cooperates with capacitor 33 to filter alternating current out of the quadrupler output 4B+.

Although the present invention has been illustrated with particular reference to voltage doubler and voltage quadrupler circuits, it is to be understood that its operation and its advantages will be equally applicable to voltage multipliers of all integral degrees of multiplication, both odd and even. It is to be further understood that while the invention has been described with respect to unidirectional conducting devices, illustrated as being of the semi-conductor type, the term rectifier or diode is meant to include both the electron discharge type of diode rectifier and the semi-conductor type of rectifier, such as germanium, selenium, or copper-oxide rectifiers, for example.

While specific embodiments have been shown and described, it will of course be understood that various modifications may be made without departing from the principles of the invention. The appended claims are therefore intended to cover any such modifications within the true spirit and scope of the invention.

What I desire to secure by Letters Patent of the United States is:

1. In a cascade-type voltage multiplier capable of N integral degrees of multiplication, input means comprising first and second conductors adapted for the application thereto of an input wave from an alternating current source, one of said conductors being designated as ground, N unidirectional conducting devices connected in series circuit relation with one another and with said input means, one end of said series circuit being proximate said first conductor, N charging capacitors each having a first electrode thereof connected to one terminal of a different one of said devices, said one terminal being remote from said first conductor, alternate ones of said capacitors having a second electrode thereof connected to the conductor that is designated as ground, alternate others of said capacitors having a second electrode thereof connected to the conductor that is remote from ground, and output means including inductance input series filtering means connected between ground and said one terminal of each of said devices which are connected by means of said alternate other capacitors to said conductor remote from ground, whereby there may be derived from said multiplier a plurality of integral multiples of rectified output voltages with respect to ground.

2. In a voltage multiplier capable of N integral degrees of multiplication, input means having a first and a second side one of which is designated ground, said input means being adapted for the application thereto of an input wave from an alternating current source, N rectifiers in series circuit relation with one another, means for connecting the first of said rectifiers to the first side of said input means, N charging capacitors each having a first electrode thereof connected to a corresponding side of a respective one of said rectifiers, alternate ones of said capacitors, beginning with the one connected to the junction between the first and the second of said rectifiers, having a second electrode thereof connected to the second side of said input means, alternate others of said capacitors having a second electrode thereof connected to the first side of said input means, and output means including inductance input series filtering means connected between the side of said input means designated ground and the side of at least one of said rectifiers connected by means of respective ones of said alternate other capacitors to the side of said input means remote from ground, whereby there may be derived a plurality of integral multiples of rectified output voltage with respect to ground.

3. A voltage multiplier comprising a plurality of unidirectional conducting devices in series circuit relation with one another, each of said devices having two terminals, input means having a first and a second side, one side of said input means being designated ground, said input means being adapted for the application thereto of an input wave from an alternating current source, means for connecting one end of said series circuit to said first side of said input means, a corresponding plurality of charging capacitors each having a first electrode thereof connected to one corresponding terminal of each rectifying device, said one terminal being the one that is remote from the first side of said input means, alternate ones of said capacitors, beginning with said capacitor connected to the device nearest the first side of said input means, having a second electrode thereof connected to said second side of the input means, alternate others of said capacitors having a second electrode thereof connected to said first side of the input means, and output means including at least one series inductance input filter section connected between the grounded side of the input means and a terminal of one of said devices which is remote from the first side of said input means, whereby there may be derived a plurality of integral multiples of rectified source voltage with respect to the side of the input means designated as ground.

4. A voltage multiplier comprising a pair of unidirectional conducting devices in series circuit relation with one another, input means having a first and a second side, said input means being adapted for the application thereto of an input wave from an alternating source, means for connecting one end of said series circuit to said first side of said input means, a pair of charging capacitors each having a first electrode thereof connected to a separate one of said devices, said connection being made to a terminal remote from said first side of the input means, said capacitor connected to said device nearest said source having a second electrode thereof connected to said second side of the input means, said other capacitor having a second electrode thereof connected to the first side of the input means, and output means including a series inductance input filter section connected between ground and said first electrode of the capacitor having its second electrode connected to the side of the source remote from ground, thereby to derive a plurality of integral multiples of rectified source voltages with respect to the side of the source designated ground.

5. In a voltage multiplier capable of N integral degrees of multiplication, input means comprising first and second conductors adapted for the application thereto of an input wave including an alternating component having a predetermined frequency, one of said conductors being designated as ground, N unidirectional conducting devices connected in series circuit relation with one another and with said input means, one end of said series circuit being proximate said first conductor, N charging capacitors each having a first electrode thereof connected to one terminal of a different one of said devices, said one terminal being remote from said first conductor, alternate ones of said capacitors having a second electrode thereof connected to the conductor that is designated as ground, alternate others of said capacitors having a second electrode thereof connected to the conductor that is remote from said ground, and output means including filtering means connected between ground and said one terminal of at least one of said devices connected to said conductor remote from ground, said filter having a high impedance to alternating current of said predetermined frequency, whereby there may be derived from said multiplier a plurality of integral multiples of rectified output voltages with respect to ground.

6. A power supply circuit adapted to produce a plurality of direct-current potentials that are integrals of a fundamental direct component of a source of alternating-current potential having one side established at a reference potential, comprising in combination, a first series circuit comprised of a first rectifier and of a first capacitor, the terminals of said first series circuit being adapted for connection to different sides of said source, a second series circuit comprised of a second rectifier and a second capacitor, means for connecting the terminal of said second series circuit that is proximate said second rectifier to the junction between said first rectifier and said first capacitor, means for connecting the other terminal of said second series circuit to the terminal of said first series circuit adjacent said first rectifier, and low-pass filtering means having a high impedance for the frequency of the alternating-current potential produced by said source and also having an output terminal at an intermediate point thereon, said low-pass filtering means being connected between the terminal of said series circuit that is adapted to be connected to the side of said source that is at the reference potential and the junction between the rectifier and capacitor of the series circuit whose respective capacitor is connected adjacent the terminal of said first series circuit that is adapted for connection to the side of the source that is remote from said reference potential.

7. A power supply circuit adapted to produce a plurality of direct-current potentials that are integrals of a fundamental direct component of a source of alternating-current potential having one side established at a reference potential, comprising in combination, a first series circuit comprised of a first rectifier and of a first capacitor, the terminals of said first series circuit adjacent said first rectifier being adapted for connection to the side of said source that is at the reference potential, the terminal of said first series circuit adjacent said first capacitor being adapted for connection to the side of said source remote from the reference potential, a second series circuit comprised of a second rectifier and a second capacitor, means for connecting the terminal of said second series circuit that is proximate said second rectifier to the junction between said first rectifier and said first capacitor, means for connecting the other terminal of said second series circuit to the terminal of said first series circuit adjacent said first rectifier, and low-pass filtering means having a high impedance for the frequency of the alternating-current potential produced by said source and also having an output terminal at an intermediate point thereon, said low-pass filtering means being connected between the terminal of said first series circuit adjacent said first rectifier and the junction between the rectifier and capacitor of the first series circuit.

8. A power supply circuit adapted to produce a plurality of direct-current potentials that are integrals of a fundamental direct component of a source of alternating-current potential having one side established at a reference potential, comprising in combination, a first series circuit comprised of a first rectifier and of a first capacitor, the terminals of said first series circuit adjacent said first capacitor being adapted for connection to the side of said source that is at the reference potential, the terminal of said first series circuit adjacent said first rectifier being adapted for connection to the side of said source remote from the reference potential, a second series circuit comprised of a second rectifier and a second capacitor, means for connecting the terminal of said second series circuit that is proximate said second rectifier to the junction between said first rectifier and said first capacitor, means for connecting the other terminal of said second series circuit to the terminal of said first series circuit adjacent said first rectifier, and low-pass filtering means having a high impedance for the frequency of the alternating-current potential produced by said source and also having an output terminal at an intermediate point thereon, said low-pass filtering means being connected between the terminal of said first series circuit adjacent said first capacitor and the junction between the rectifier and the capacitor of the second series circuit.

References Cited in the file of this patent

UNITED STATES PATENTS

| Number | Name | Date |
|---|---|---|
| 1,992,908 | Cockcroft et al. | Feb. 26, 1935 |
| 2,072,278 | Schade | Mar. 2, 1937 |